United States Patent [19]
Zhong

[11] Patent Number: 6,132,111
[45] Date of Patent: Oct. 17, 2000

[54] MANUAL DRIVE CONTROL SYSTEM FOR A CAMERA

[75] Inventor: Jie Zhong, Dong Guan, China

[73] Assignee: Ginfax Development Limited, Chai Wan, The Hong Kong Special Administrative Region of the People's Republic of China

[21] Appl. No.: 09/131,431

[22] Filed: Aug. 10, 1998

[30] Foreign Application Priority Data

Aug. 28, 1997 [GB] United Kingdom .................... 9718262

[51] Int. Cl.⁷ .................................................. G03B 1/00
[52] U.S. Cl. ........................ 396/411; 396/348; 396/413; 396/535
[58] Field of Search ..................................... 396/178, 348, 396/387, 401, 411, 413, 535; D16/201, 211, 212

[56] References Cited

U.S. PATENT DOCUMENTS

| | | | |
|---|---|---|---|
| 3,423,041 | 1/1969 | Steisslinger et al. ................... | 396/413 |
| 4,819,016 | 4/1989 | Leonard et al. ..................... | 396/535 X |
| 5,555,055 | 9/1996 | Stephenson, III ................... | 396/411 X |
| 5,778,269 | 7/1998 | Williams ............................. | 396/411 X |

FOREIGN PATENT DOCUMENTS 1216572A 12/1970 United Kingdom .

*Primary Examiner*—Alan A. Mathews

[57] ABSTRACT

A manual film drive control system for a camera having a manual film drive, the control system comprising a film drive actuation means (85) and a film drive direction switch (90), the film drive actuation means being movable in two directions, movement in the first direction causing the film drive to move in a film advance direction and movement in a second direction causing the film drive to move in a film rewind direction, the film drive direction switch being moveable between a film advance mode in which it allows the film drive actuation means to move in the first direction but not in the second direction and a film rewind mode in which it allows the drive actuation means to move in the second direction, but not in the first direction.

22 Claims, 8 Drawing Sheets

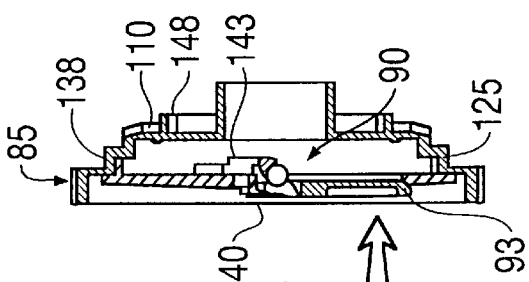
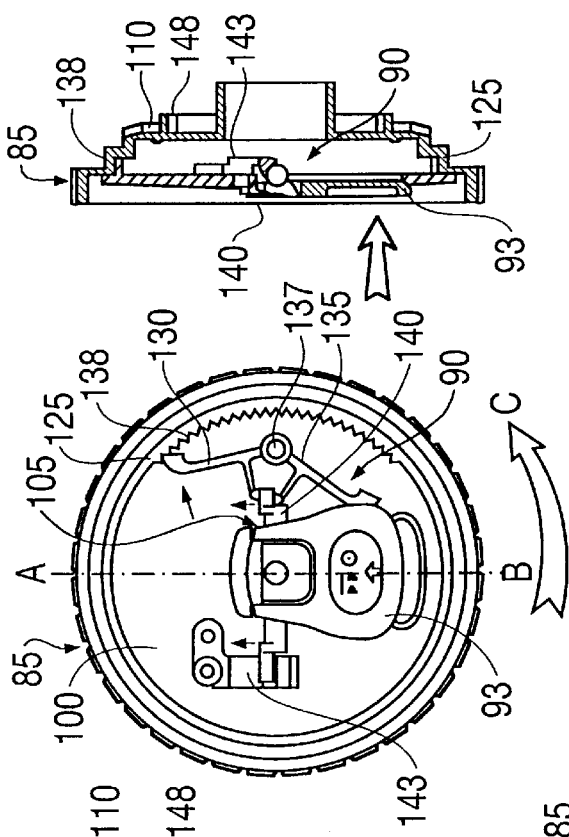
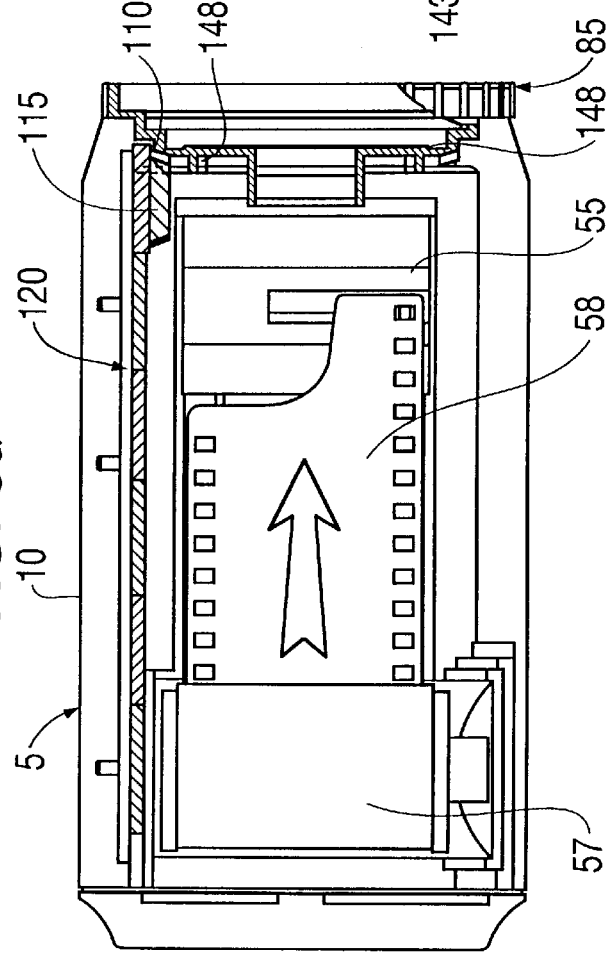

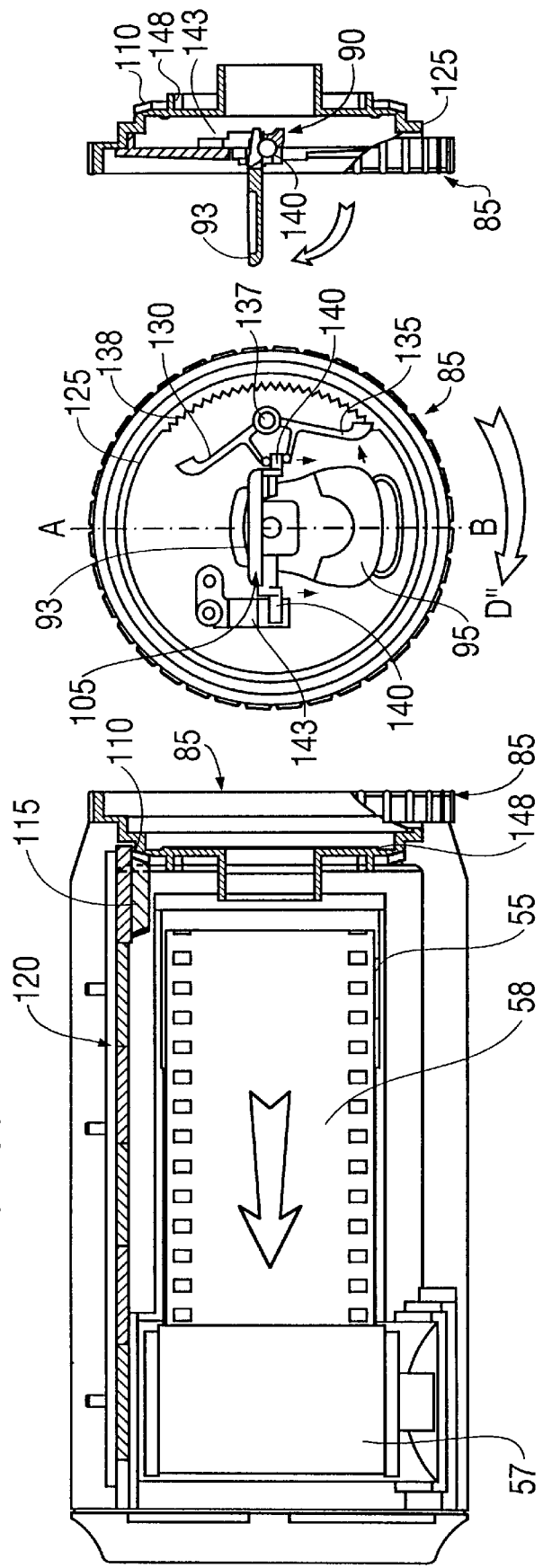

MANUAL DRIVE CONTROL SYSTEM FOR A CAMERA

This invention relates to a manual film drive control system for a camera. In particular, this invention relates to a manual film drive control system having a film drive direction switch which dictates the direction of movement of a film drive.

Known cameras include various examples of film drive mechanisms with manual or automatic control of film direction in film advance or rewind mode. Many of these mechanisms are complex, not particularly easy to use, and not suitable for low cost and/or novelty cameras or cameras suitable for use by children.

An object of the present invention is to provide a manual film drive control system for a camera which is easy to use, inexpensive to produce and/or which is adaptable for use in cameras with novelty shapes, or at least to provide the public with a useful choice.

According to the present invention there is provided a manual film drive control system for a camera comprising having a manual film drive, the control system comprising a film drive actuation means and a film drive direction switch, the film drive actuation means being moveable in two directions, movement in the first direction causing the film drive to move in a film advance direction and movement in a second direction causing the film drive to move in a film rewind direction, the film drive direction switch being moveable between a film advance mode in which it allows the film drive actuation means to move in the first direction but not in the second direction and a film rewind mode in which it allows the drive actuation means to move in the second direction, but not in the first direction.

Preferably the film drive actuation means is rotatable, movement in the first direction being rotation in either a clockwise or anti-clockwise direction and movement in the second direction being rotation in the opposite direction.

Preferably, the film drive direction switch is provided with a switch actuation member which is moveable from a film advance mode position to a film rewind mode position and the switch actuation member when in one of the film advance mode position or the film rewind mode position is in substantially the same plane as when in the other of the film advance mode position or film rewind mode position. In another embodiment, the plane of the switch actuation member when in the film advance mode position or the film rewind mode position is different to the plane of the switch actuation member when in the other of the film advance mode position or the film rewind mode position.

Preferably, the camera comprises a camera housing, and the switch actuation member is pivotally attached to the camera housing, the switch actuation member suitably being pivotable from a position in which it is substantially flush with the housing to a position in which it extends away from the housing.

Preferably, the film drive comprises a gear train connecting both first and second film receiving spools and the film drive actuation means, the film drive being operative to rotate the first and second spools in the same direction, the film drive actuation means including a toothed gear wheel, the teeth of which cooperate with the teeth of a first gear in the film drive gear train.

Preferably, the film drive actuation means includes a toothed ratchet wheel, the teeth of which cooperate with pawls of the film drive direction switch, the film drive direction switch comprising first and second pawls, the first pawl operatively engaging the teeth of the ratchet wheel of the film drive actuation means when the switch is in the film advance mode and, when engaged with the ratchet wheel, allowing movement of the film drive actuation means and film drive in a film advance direction only, and the second pawl operatively engaging the teeth of the ratchet wheel when the switch is in the fin rewind mode and, when engaged with the ratchet wheel, allowing movement of the film drive actuation means and film drive in the film rewind direction only.

Preferably, the teeth of the ratchet wheel extend towards a centre of the wheel and the pawls of the switch are positioned within the circumference of the wheel.

Suitably, the camera housing resembles a conventional beverage can and the film drive actuation means resembles the top of the can. One end of the housing may then be provided with an outline of a beverage can ring pull and the switch actuation member may be positioned within the outline of the ring pull. Alternately, the switch actuation member may resemble a ring of a conventional beverage can ring pull and be positioned on an end of camera housing.

According to the present invention there is also provided method of controlling a film drive of a camera comprising the steps of providing in a camera a manual film drive control system as described above, and moving the film direction switch between a film advance mode and a film rewind mode to determine the direction of movement of a film within the camera.

Preferred embodiments of the invention will now be described with reference to the accompanying drawings in which:

FIG. 5a is partial longitudinal-section through a camera with a manual film drive control system of the present invention in a film advance mode;

FIG. 5b is an end view partially cut away of a drive actuation means and a film drive direction switch of the camera shown in FIG. 3;

FIG. 5c is a section through the line A-B of FIG. 5b;

FIG. 6a is partial longitudinal-section through a camera with a manual film drive control system of the present invention in a film rewind mode;

FIG. 6b is an end view partially cut away of a film drive actuation means and a film drive direction switch of the camera shown in FIG. 4;

FIG. 6c is a section through the line A-B of FIG. 6b;

FIG. 7b is a section through the line A-B of FIG. 7a;

FIG. 8b is a section through tie line A-B of FIG. 8a;

Figure 1:
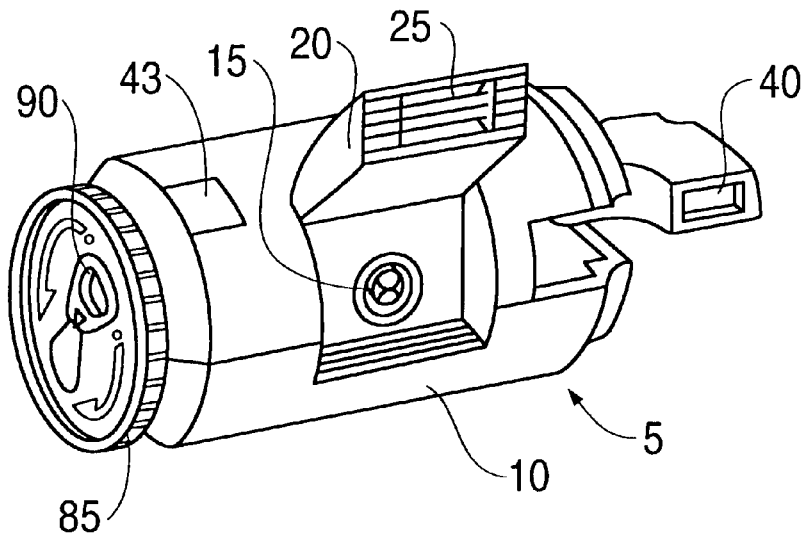
FIG. 1 is a front perspective view of a camera with a first embodiment of a manual film drive control system of the present invention.
Figure 2:
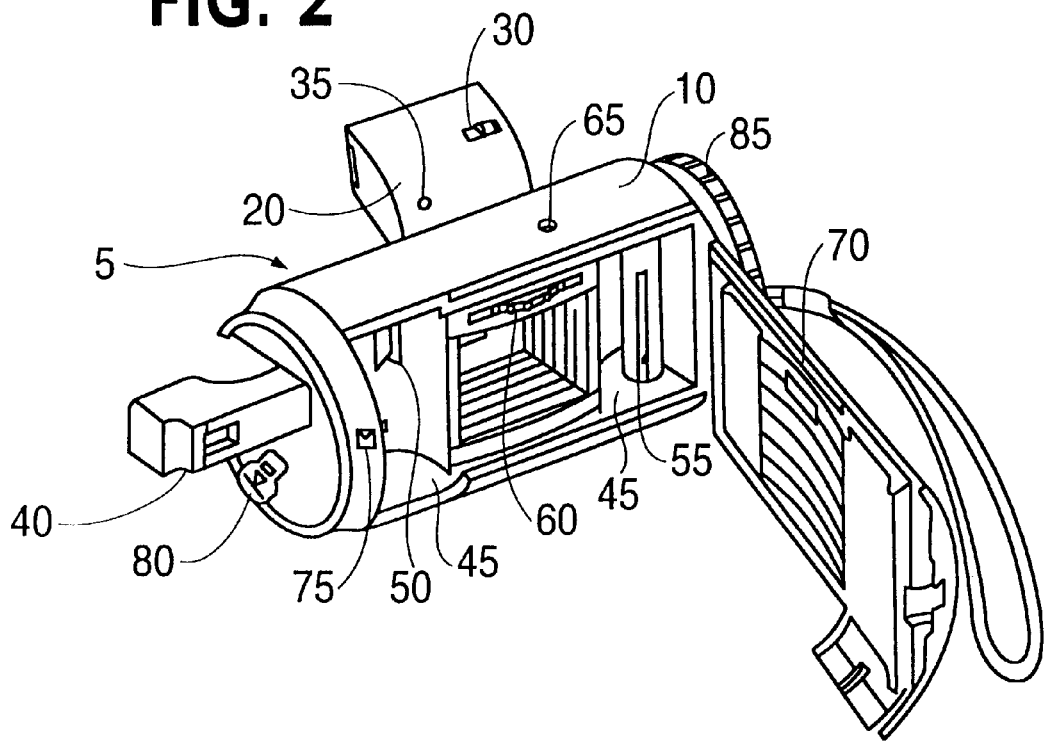
FIG. 2 is a rear perspective view of the camera of FIG. 1.

Referring to the drawings, FIGS. 1 and 2 show a camera 5 suitable for use with a manual film drive control system of the present invention. It will be understood that the manual film drive control system of the present invention may be used with many different types of camera with various housing shapes and the camera shown in the drawings is for the purposes of illustrating the invention only.

Figure 3:
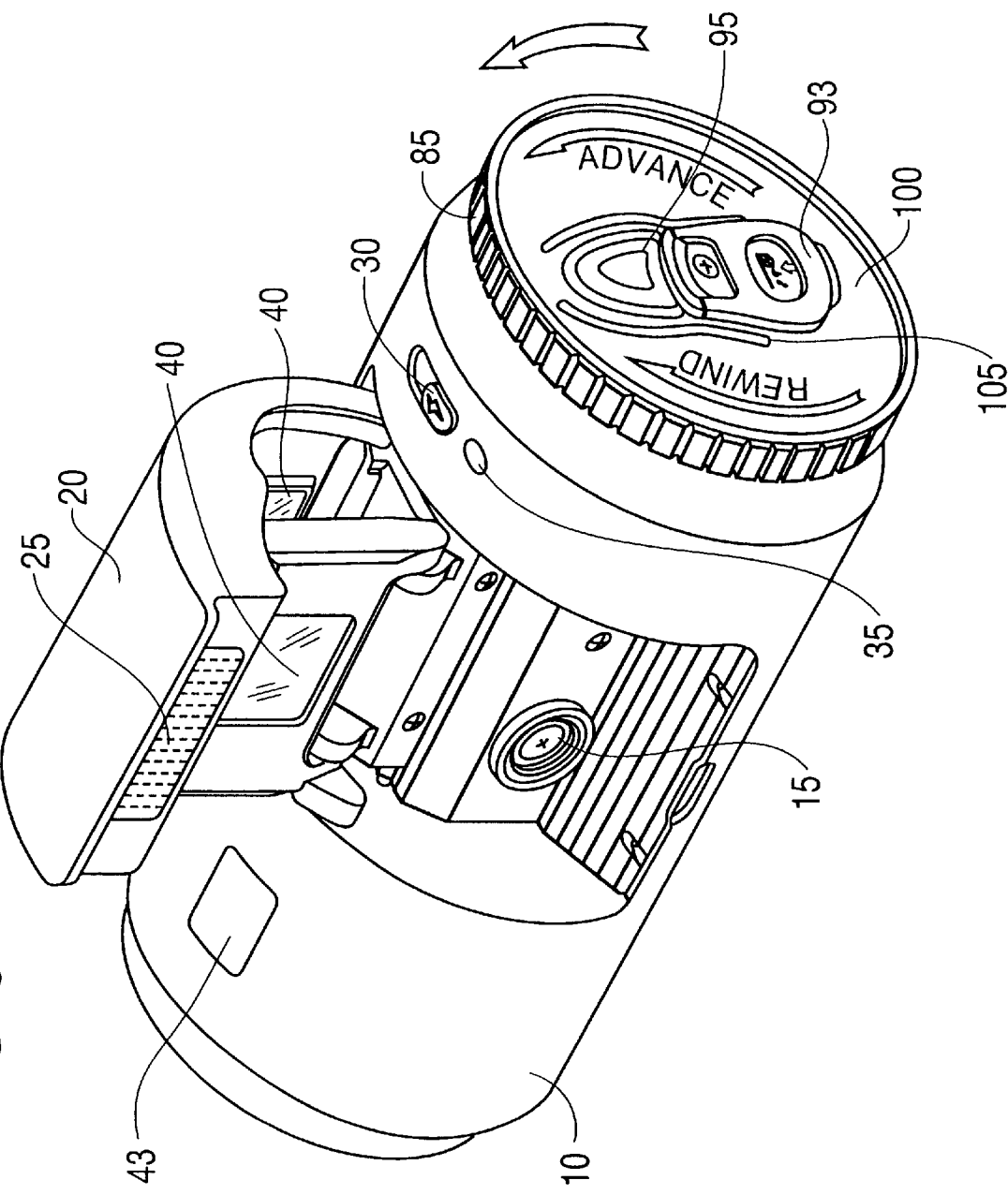
FIG. 3 is a front perspective view of a camera with a second embodiment of a manual film drive control system of the present invention in a first position.
Figure 4:
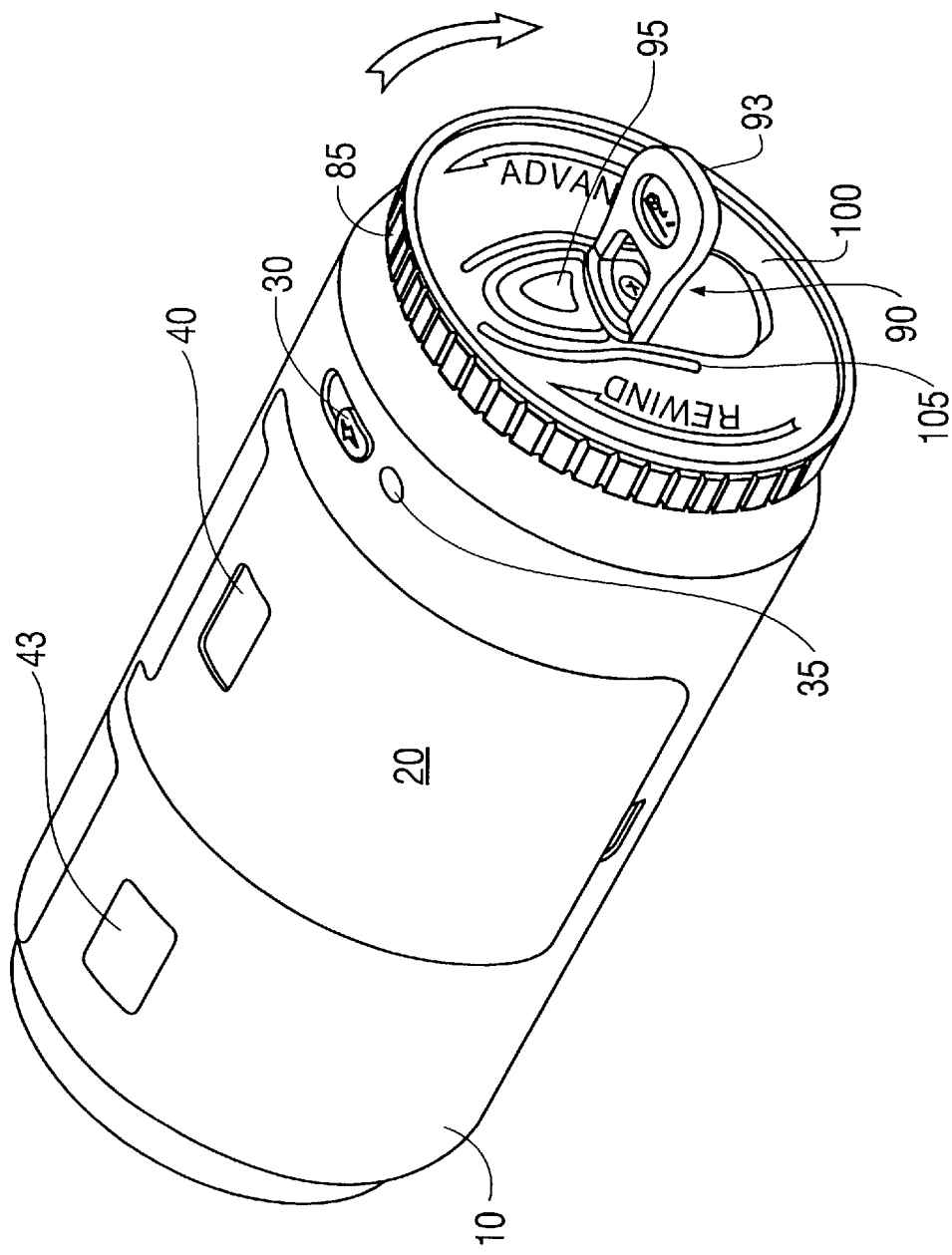
FIG. 4 is a front perspective view of a camera with a second embodiment of a manual film drive control system of the present invention in a second position.
Figure 7A:
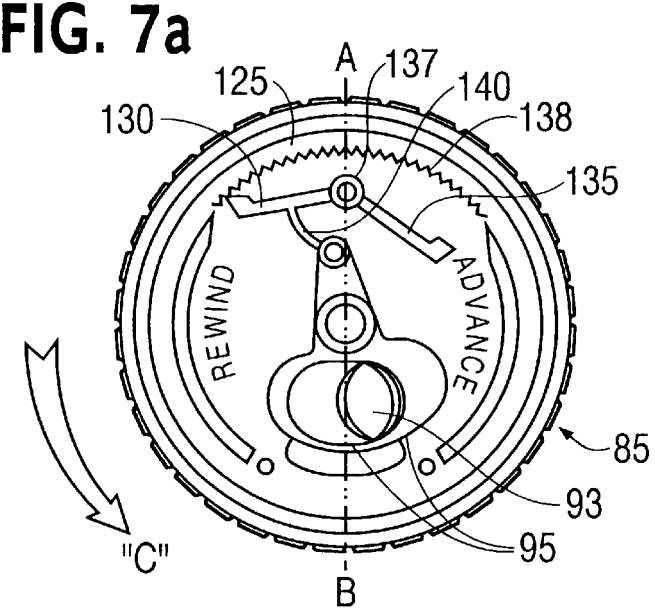
FIG. 7a is an end view partially cut away of a film drive actuation means and a film drive direction switch of the camera shown in FIG. 1 in a first position.
Figure 7B:
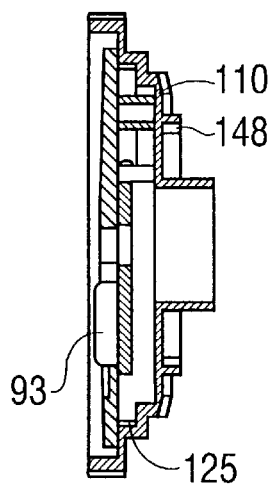
Figure 8A:
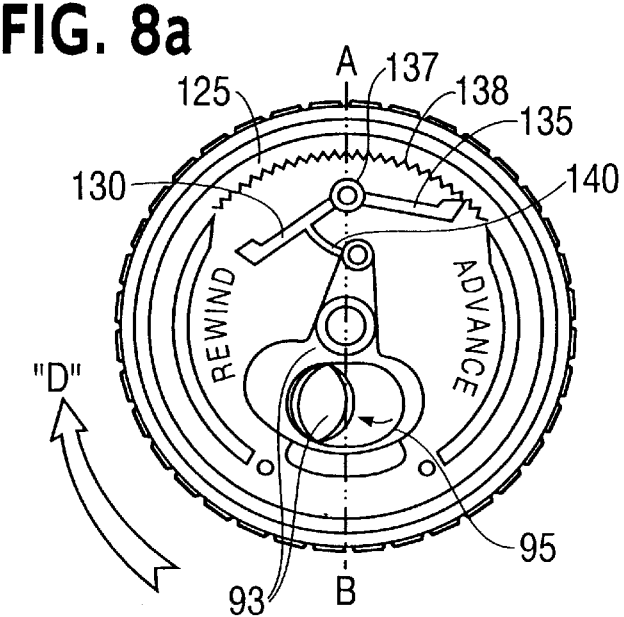
FIG. 8a is an end view partially cut away of a film drive actuation means and a film drive direction switch of the camera shown in FIG. 1 in a second position.
Figure 8B:
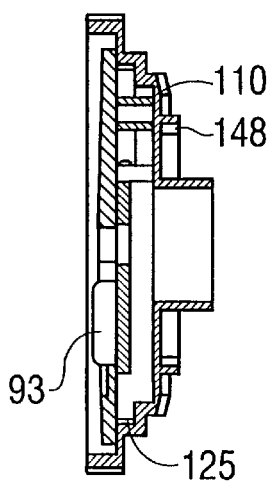

The camera 5 shown has a housing 10 in the shape of a conventional beverage can when all moveable parts are folded away (see FIG. 4) and is of standard construction having a lens 15, a lens cover 20 which pivots from a position shown in FIG. 4 in which it covers the lens 15 to a position shown in FIGS. 1 and 2 in which it exposes the lens 15 for use. The lens cover may be provided with a flash 25, and a flash power switch 30 is conveniently placed near the flash on the lens cover 20 along with a light 35 for indicating when the flash 25 is ready for use. The flash switch 30 and light 35 could also be situated on the housing as shown in FIGS. 3 and 4.

Figure 10:
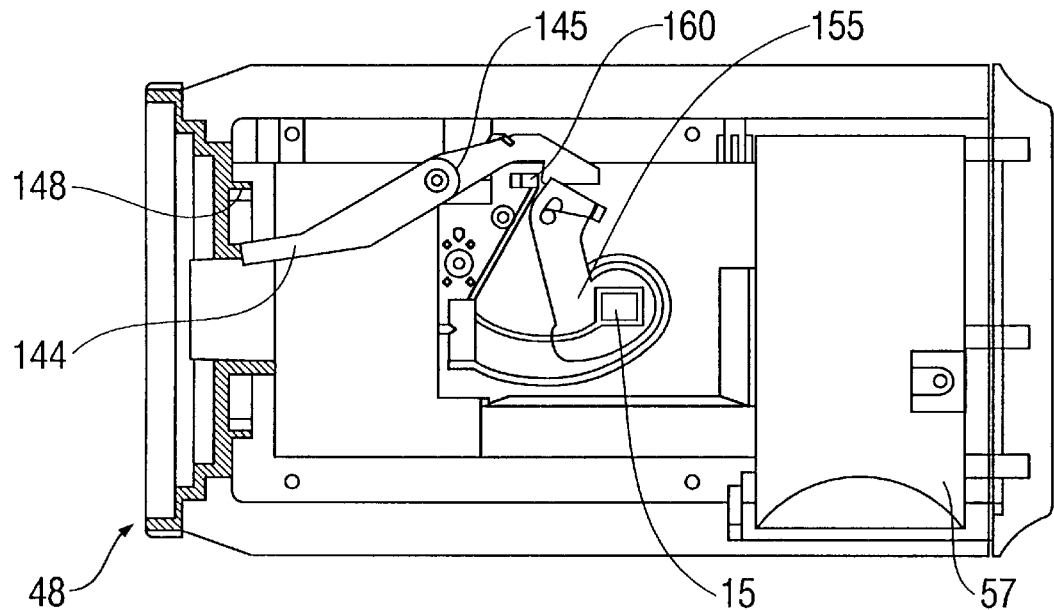
FIG. 10 is a longitudinal section through a camera showing a lever system for shutter control suitable for use with a manual film drive control system of the present invention.

The camera is also provided with a view finder 40 which can be conveniently folded into the camera housing 10 when not in use. Alternatively, as shown in FIGS. 3 and 4, the viewfinder 40 may be located in the lens cover 20. Shutter release button 43 releases a shutter (see FIG. 10) for taking a picture.

Figure 11:
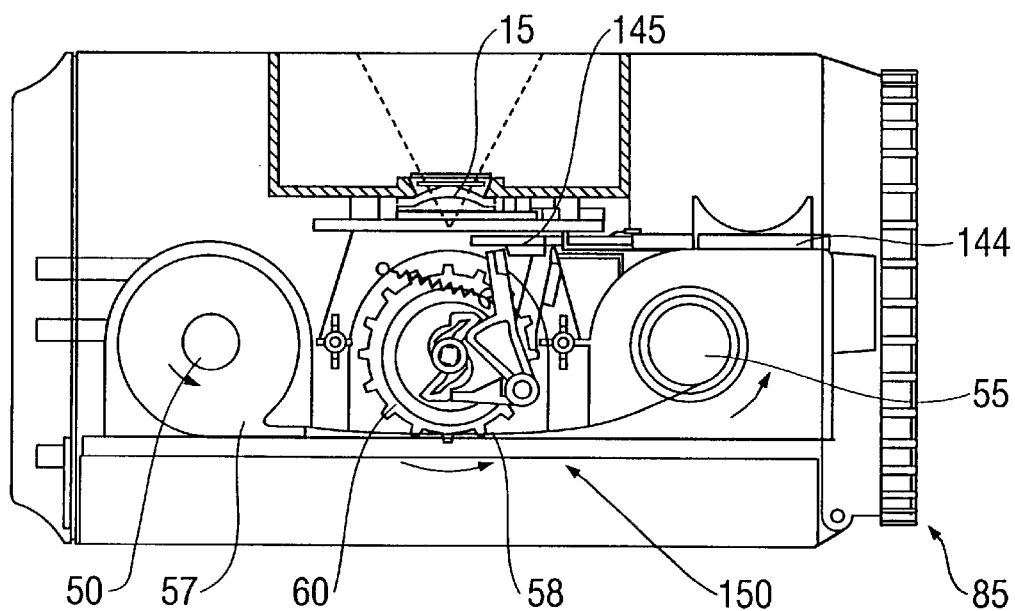
FIG. 11 is a cut away top view of a camera showing a lever system for shutter control and film advance distance control suitable for use with a manual film drive control system of the present invention.

The camera is provided with a film cavity 45 having a first film spool 50 for receiving a wound film in a film canister 57 (see FIGS. 5a and 6a) and a second film spool 55 for taking up an end of a new roll of film 58 and for taking up succesive frames of film 58 after they have been exposed. A sprocket wheel 60 guides the film in a well known manner between the spools and also cooperates with a shutter control lever system as described below in reference to FIGS. 10 and 11. Movement of the sprocket wheel also actuates an exposure counter 65. The cavity 45 is protected by a back cover 70, which has an opening switch 75. A battery case 80 is provided to receive batteries for powering a circuit (not shown) which operates the flash 25.

According to the invention, the camera 5 is provided with a film drive control system which is made up of a film drive actuation means 85 and a film drive direction switch 90. When the camera 5 is in the shape of a beverage can, the film drive actuation means 85 suitably resembles a top of the can, with the film drive direction switch being located within the actuation means 85 and) in a first embodiment, extending as switch actuation member 93 in an outline 95 of a can ring pull.

The film drive actuation means 85 is movable in two directions as shown by the arrows (FIGS. 5a, 6a, 9a and 9b), movement in a first direction causing a film drive to move in a film advance direction and movement in a second direction causing the film drive to move in a film rewind direction. As can be seen in the drawings, in which the film drive actuation means is circular, rotation in an anti-clockwise direction advances the film and rotation in a clockwise direction, rewinds the film (or vice versa). Of course the film drive actuation means need not be circular in external shape, but should still be rotatable to cooperate with the film drive as described below.

The film drive direction switch 90 is moveable between two positions. The fist position is a film advance mode in which it allows the film drive actuation means 85 to move in the first direction (to advance the film) but not in the second (rewind) direction, thereby preventing the inadvertent rewinding of the film whilst there is film still available for exposure. The second position is a film rewind mode in which the switch 90 allows the drive actuation means 85 to move in the second direction (to rewind the film), but not in the first (advance) direction, thereby preventing the inadvertent advancement of the film when the film is being rewound.

When a film 58 has been rewound, the film canister 57 may be exchanged for a new canister containing fresh unexposed film. The film drive direction switch 90 must then be reset, either mechanically on insertion of the fresh film or by hand, by moving the film direction switch 90 back to the film advance mode.

The film drive direction switch thereby works as a kind of safety latch to ensure that the film drive is movable only in the direction of choice.

The film drive direction switch 90 may be of any configuration which suits the particular camera housing being used. When the camera housing 10 is shaped as a beverage can, the switch 90 may be provided with a switch actuation member 93 fashioned in the shape of a ring of a can ring pull (see FIGS. 3–6c). When the switch actuation member or ring 93 is flush with the top 100 of the "can" (FIGS. 3, 5b and 5c), the switch is in the film advance mode, and when the ring 93 is lifted out of the plane of the top 100 of the "can" by pivoting about pivot point 105 (FIGS. 4, 6b and 6c), the switch 90 moves into the film rewind mode (or vice versa). This arrangement contributes to the overall resemblance of the camera to a beverage can. Similarly, as shown in FIGS. 1, 7a, 7b, 8a and 8b, the switch actuation member could be a button which is moved from side to side (within the outline of the can ring pull) in the same plane as the top 100 of the "can".

The above are just two examples of a great number of variations in the shape, size and movement of the film direction switch and attendant switch actuation means suitable for use in the manual film drive control system of the present invention. For example, a press button switch could be used, or the switch could be circular and turned or wound between the film advance and film rewind modes.

Thus, the film direction actuation means and film drive direction switch may be of any shape which suits the design of the camera housing 10. For example, the camera housing could be in the shape of a jar, with the film drive actuation means resembling a lid of the jar and the switch resembling a pop-up safety button. Alternatively, the camera housing could resemble a bottle, the film drive actuation means resembling the neck of the bottle and the switch resembling the cap and so on. In fact, the housing need not be cylindrical and could take any shape, even that of a toy doll or a toy animal, turning of one of the doll's or animal's body parts (such as a head or an arm) resulting in the actuation of the film drive, the switch actuation member being a tail, eye or mouth of the doll or animal.

FIGS. 5a–5c and 6a–6c show one embodiment of how a film drive direction switch 90 and film drive actuation means 85 of the present invention might work together with a film drive to form the film drive control system of the invention. The, film drive actuation means comprises a toothed gear wheel 110, the teeth of which cooperate with the teeth of a first gear 115 of a film drive gear train 120 (see also FIGS. 9a and 9b). Rotation of the film drive actuation means 85 therefore results in rotation of the first gear 115 and consequently the whole gear train in a manner well known in the art. The film drive actuation means also comprises a toothed ratchet wheel 125, the teeth 138 of which cooperate with the film drive direction switch 90.

The film drive direction switch is suitably provided with a pair of pawls or resilient arms 130, 135 connected around and rotatable about a pivot pin 137 extending from the top 100 of the "can". The pawls are actuated by an engagement member 140 extending from the switch actuation member 93 and engaging one or other or both of the pawls 130, 135. In the first embodiment shown in FIGS. 5b and 6b the engagement member also extends to engage a stop member 143 which gives the switch a "snap" action as is well known in the art.

The first pawl 130 operatively engages teeth 138 (only partly shown in FIGS. 5b, 6b, 7a and 8a, but extending around the ratchet wheel) of the ratchet wheel 125 when the switch is in the film advance mode (FIGS. 5a, 5b, 5c, 7a and 7b). In this mode, the pawl 130 allows the film drive actuation means 85 to move in one direction only (direction "C" in FIG. 5b and 7a), that being the film advance direction. The second pawl operatively engages the teeth 138 of the ratchet wheel 125 when the switch is in the film rewind mode (FIGS. 6a, 6b, 6c, 8a and 8b). In this mode, the pawl 135 allows the film drive actuation means to move in the film rewind mode only (direction "D" in FIGS. 6b and 8a).

In the embodiment shown in FIGS. 3, 4 and 5a–6c, the lifting of the switch actuation member and its consequent pivoting about pivot point 105, moves a pawl engagement member 140 from the position shown in FIGS. 5b and 5c to the position shown in FIGS. 6b and 6c thus causing one pawl 130, 135 to disengage the c ratchet wheel and the other to engage the ratchet wheel in a manner which will be well known to those skilled in the art to which this invention relates.

The engagement of the pawls with the ratchet wheel may of course be controlled in many other ways, and would also depend on the type of switch actuation member used. An alternative pawl control as may be used with the switch actuation member shown in FIG. 1 is shown in FIGS. 7a, 7b, 8a and 8b such pawl and ratchet arrangements being well known to those skilled in the art to which this invention relates.

The film drive direction switch need not be positioned on the drive actuation means, and may be adjacent the film drive actuation means whilst still cooperating with it. In such a situation, the teeth 138 of the ratchet wheel 125 may extend outwardly to receive pawls 130, 135 of the switch 90 extending from a switch actuation member positioned away from the film drive actuation means.

Figure 9A:
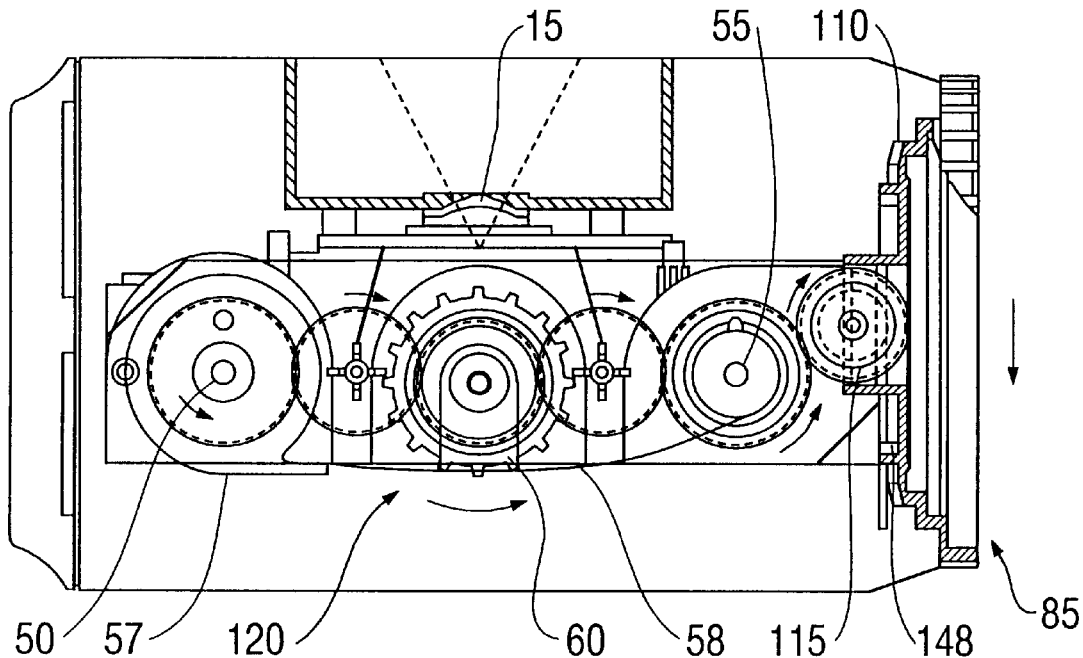
FIG. 9a is a cut away top view of a camera having a film drive, in film advance mode, suitable for use with a manual film drive control system the present invention.
Figure 9B:
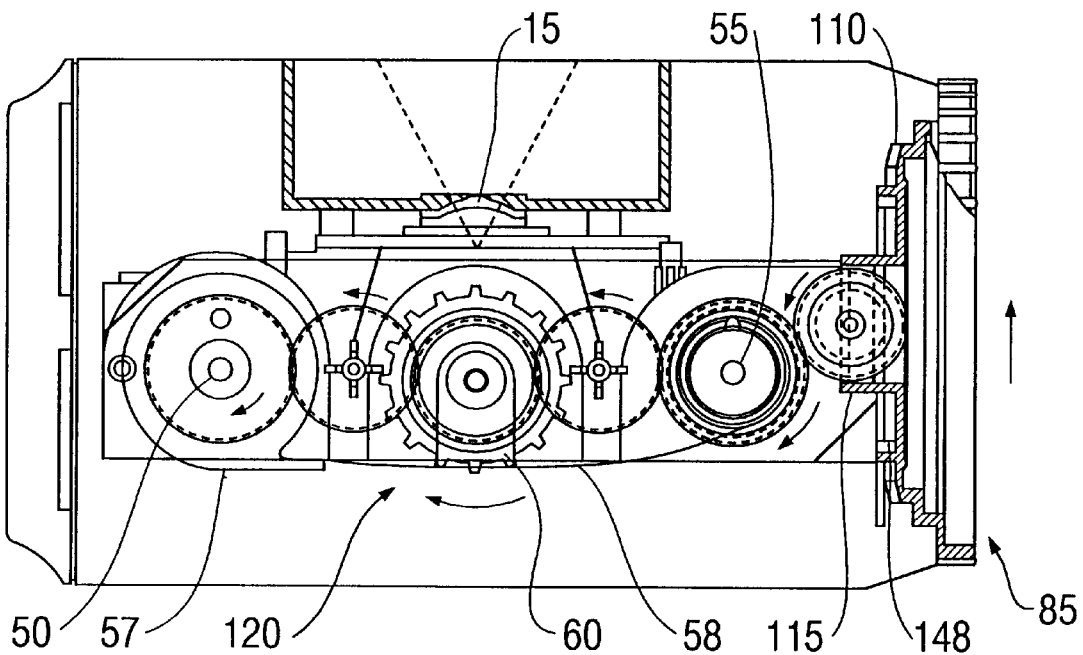
FIG. 9b is a cut away top view of a camera having a film drive, in film rewind mode, suitable for use with a manual film drive control system of the present invention.

The manual film drive control system of the present invention thus comprises a film drive actuation means 85 and a film drive direction switch 90 as described above, which cooperate with a film drive. The function of one suitable film drive is shown in FIGS. 9a and 9b. The film drive shown comprises a plurality of intermeshing gears in a gear train 120. The gear train 120 connects first and second film spools 50, 55, The gears in the gear train are arranged in relation to each other and connected to the spools in such a manner that rotation of one of the gears in the gear train will result in rotation of the spools in a single spool rotation direction. Thus, rotation of the first gear 115 in the gear train by rotation of the film drive actuation means will result in rotation of the two spools in a single spool rotation direction resulting in either the advancement or the rewinding of the film depending on the direction of rotation of the spools.

The film drive actuation means 85 may be prevented from advancing the film more than one frame at a time in any conventional manner. In the embodiment shown in the drawings, particularly FIGS. 10 and 11, an arm 144 extends rewardly of a shutter release lever 145 connected to the shutter release button 43. Through a standard system of levers 150 connected to the sprocket wheel 60, the arm extending rearwardly of lever 145 is kept clear of a second ratchet wheel 148 on the film drive actuation means 85 (see also FIGS. 5a, 5c, 6a and 6c) whilst the film is advancing one frame, but after advancing one frame, the system of levers causes the arm to engage the ratchet wheel 148 to prevent it from advancing further. The shutter release button 43 must then be depressed resulting in release of the shutter via shutter lever 160 and the disengagement of the arm 144 from the ratchet wheel 148, thus allowing the film drive actuation means to again rotate to advance the film one frame. Of course many other simple mechanical arrangements could be used to achieve the same effect and the above is described and shown as an example only of a type of system which might be suitable for use with the manual film drive control system of the present invention.

The above describes preferred embodiments of the invention, improvements or modifications in which may be made without departing from the scope of the invention as defined in the accompanying claims.

What I claim is:

1. A manual firm drive control system for a camera having a housing and a film drive, the control system comprising a film drive actuation means and a film drive direction switch, the film drive actuation means being movable in two directions, movement in the first direction causing the film to move in a film advance direction and movement in a second direction causing the film drive to move in a film rewind position, the film drive direction switch being moveable between a film advance mode in which it allows the film drive actuation means to move in the first direction but not in the second direction and a film rewind mode in which it allows the drive actuation means to move in the second direction, but not in the first direction, the housing being cylindrical in shape with the film drive actuation means forming one end of the cylinder, the plane of the film drive being substantially perpendicular to the plane of the film drive actuation means.

2. A manual film drive control system for a camera as claimed in claim 1, wherein the film drive actuation means is rotatable, movement in the first direction being rotation in a clockwise direction and movement in the second direction being rotation in an anti-clockwise direction.

3. A manual film drive control system for a camera as claimed in claim 1, wherein the film drive actuation means is rotatable, movement in the first direction being rotation in an anti-clockwise direction and movement in the second direction being rotation in a clockwise direction.

4. A manual film drive control system for a camera as claimed in claim 1, wherein the film drive direction switch is provided with a switch actuation member which is moveable from a film advance mode position to a film rewind mode position.

5. A manual film device control system for a camera as claimed in claim 4, wherein the switch actuation member when in one of the film advance mode position or the film rewind mode position is in substantially the same plane as when in the other of the film advance mode position or film rewind mode position.

6. A manual film drive control system for a camera as claimed in claim 5, wherein the camera comprises a camera housing, the switch actuation member being pivotally attached to the camera housing.

7. A manual film drive control system for a camera as claimed in claim 4, wherein the plane of the switch actuation member when in the film advance mode position or the film rewind mode position is different to the plane of the switch actuation member when in the other of the film advance mode position or the film rewind mode position.

8. A manual film drive control system for a camera as claimed in claim 4, wherein the switch actuation member is pivotable from a position in which it is substantially flush with the housing to a position in which it extends away from the housing.

9. A manual film drive control system for a camera as claimed in claim 1, wherein the film drive comprises a gear train connecting both first and second film receiving spools and the film drive actuation means, the film drive being operative to rotate the first and second spools in the same direction.

10. A manual film drive control system for a camera as claimed in claim 9, wherein the film drive actuation means includes a toothed gear wheel, the teeth of which cooperate with the teeth of a first gear in the film drive gear train.

11. A manual film drive control system for a camera as claimed in claim 1, wherein the film drive actuation means includes a toothed ratchet wheel, the teeth of which cooperate with pawls of the film drive direction switch.

12. A manual film drive control system for a camera as claimed in claim 11, wherein the film drive direction switch comprises first and second pawls, the first pawl operatively engaging the teeth of the ratchet wheel of the film drive actuation means when the switch is in the film advance mode and, when engaged with the ratchet wheel, allowing movement of the film drive actuation means and film drive in a film advance direction only, and the second pawl operatively engaging the teeth of the ratchet wheel when the switch is in the film rewind mode and, when engaged with the ratchet wheel, allowing movement of the film drive actuation means and film drive in the film rewind direction only.

13. A manual film drive control system for a camera as claimed in claim 12, wherein the pawls are resilient arms extending from and connected to a switch actuation member of the film drive direction switch.

14. A manual film drive control system for a camera as claimed in claim 4, wherein the pawls are actuated by an engagement member extending from the switch actuation member and engaging a pawl or pawls.

15. A manual film drive control system for a camera as claimed in claim 1, wherein the film drive direction switch is positioned on and within the film drive actuation means.

16. A manual film drive control system for a camera as claimed in claim 11, wherein the teeth of the ratchet wheel extend towards a centre of the wheel and the pawls of the switch are positioned within the circumference of the wheel.

17. A manual film drive control system for a camera as claimed in claim 6, wherein the film drive actuation means forms part of the camera housing.

18. A manual film drive control system for a camera as claimed in claim 1, wherein the camera housing is shaped and ornamented to simulate the appearance of a conventional beverage can.

19. A manual film drive control system for a camera as claimed in claim 18, wherein the camera housing is shaped and ornamented to simulate the appearance of the top of a conventional beverage can.

20. A manual film drive control system for a camera as claimed in claim 18, wherein the camera housing is shaped and ornamented to simulate the appearance of a conventional beverage can, one end of the housing being provided with an outline of a beverage can ring pull and the switch actuation member being positioned within the outline of the ring pull.

21. A manual film drive control system for a camera as claimed in claim 20, wherein the camera housing is shaped and ornamented to simulate the appearance of a conventional beverage can and the film drive direction switch is provided with a switch actuation member resembling a ring of a conventional beverage cap ring pull and positioned on an end of the camera housing.

22. A camera having a housing, a film drive and a film driver control system, the control system comprising a film drive actuation means and a film drive direction switch, the film drive actuation means being movable in two directions, movement in the first direction causing the film to move in a film advance direction and movement in a second direction causing the film drive to move in a film rewind position, the film drive direction switch being moveable between a film advance mode in which it allows the film drive actuation means to move in the first direction but not in the second direction and a film rewind mode in which it allows the drive actuation means to move in the second direction, but not in the first direction, the housing being cylindrical in shape with the film drive actuation means forming one end of the cylinder, the plane of the film drive being substantially perpendicular to the plane of the film drive actuation means.

* * * * *